Nov. 24, 1964 T. BUDZICH 3,157,996
HYDROSTATIC TRANSMISSION
Filed July 18, 1962 3 Sheets-Sheet 1

Fig. 1

INVENTOR.
TADEUSZ BUDZICH
BY
RICHEY, McNENNY & FARRINGTON
ATTORNEYS

Nov. 24, 1964

T. BUDZICH 3,157,996

HYDROSTATIC TRANSMISSION

Filed July 18, 1962

INVENTOR.
TADEUSZ BUDZICH
BY
RICHEY, McNENNY & FARRINGTON

ATTORNEYS

Fig. 3

INVENTOR.
TADEUSZ BUDZICH
BY
RICHEY, McNENNY & FARRINGTON
ATTORNEYS

United States Patent Office 3,157,996
Patented Nov. 24, 1964

3,157,996
HYDROSTATIC TRANSMISSION
Tadeusz Budzich, 3344 Colwyn Drive,
Shaker Heights, Ohio
Filed July 18, 1962, Ser. No. 210,663
17 Claims. (Cl. 60—53)

This invention relates generally to fluid power systems and more particularly to hydrostatic fluid power transmission employing variable speed reciprocating piston fluid motors of the rotary cam plate type.

Hydrostatic transmission systems use pumps and fluid motors for transmitting power from a driving source for the pump to a load driven by a motor at varying speeds and at a pressure level within the system generally proportional to the torque required by the driven load. In hydrostatic transmission circuits which employ more than one hydraulic motor supplied from a single pump, the system operates at its full efficiency only when all of the motors are loaded in the same proportion to their rated output. If one of the motors becomes unloaded so that its output torque decreases, the motor tends to speed up and thereby consume a greater volume of fluid at a lower pressure. When this happens, the pressure throughout the system at both the pump and the other motors drops to a level determined by the operation of the unloaded motor. When the system pressure drops, the torque output of the other motors in the system also decreases, and they are no longer able to drive their respective loads at the proper speed. Thus, the operating efficiency of the system is limited by the efficiency of the motor having the lightest load in proportion to its torque capacity.

In order to overcome this problem, it has been proposed to use brakes for each motor which are to be applied if the motor becomes unloaded to prevent any speed increase and thereby provide an artificial load to maintain the system pressure. Various hydraulic devices have also been proposed, such as flow dividing valves, throttling valves and similar devices to limit the volume of fluid flow to an unloaded motor and prevent any increase in speed. These approaches all have the disadvantage that because of the braking, throttling action or other form of energy dissipation, they decrease the overall efficiency of the system as a power transmitting device and have limited the application in which such systems have been used. Another disadvantage of these attempted solutions is that the tendency of the system pressure to fluctuate is not completely eliminated and pressure variations still occur during changes of the loading of the various motors as a result of changing torque requirements of the various motors. For this reason, other and additional hydraulic devices which require a constant and unfluctuating pressure source for their operation cannot be connected in the same fluid circuit and operated from the same pump as the fluid motors.

It is therefore a principal object of this invention to provide a hydrostatic power transmission system employing a plurality of fluid motors supplied by a single pump which operate independently of each other at varying speeds and loads while using a fluid at a constant pressure which varies according to the power output of the motor.

Another object of this invention is to provide a hydrostatic power transmission having a plurality of fluid motors which may be independently controlled while using fluid pressure supplied from a single variable volume pressure compensated pump to allow integration of other hydraulic devices into the power circuit to form a centralized hydraulic power system.

Another object of this invention is to provide a hydrostatic power transmission having a plurality of fluid motors and a single pump as a pressure source in which the motors operate from the pump at a relatively high pressure level while they are controlled through a hydraulic control circuit supplied from the same pump but operating at a substantially lower pressure level.

Another object of this invention is to provide a hydrostatic power transmission system having a single pump and a plurality of fluid motors which includes an energy storing device in the form of a hydraulic accumulator connected in a pressure line between the pump and the motors. The accumulator operates both to store energy from the pump when the pump is working at a capacity in excess of the requirements of the various motors and to absorb and store kinetic energy from the driven load during deceleration or braking conditions at the motors. This allows the conservation of the energy and braking load on the motors by converting the energy back into pressurized fluid rather than dissipating it in heat as in conventional braking devices. The energy stored in the accumulator increases the transient capacity of the system and provides a temporary maximum power level considerably in excess of the maximum capacity of the pump.

Another object of this invention is to provide a hydrostatic power transmission system having a plurality of fluid motors in which the speed of the motors is independent of the pressure and fluid volume from the pump, and is controlled through a separate power source so that the system lends itself readily to modular design concepts in which the entire system can be assembled from individual standardized units, with each fluid motor having a self-contained control system which is operable independent of the control system for each of the other motors.

Another object of this invention is to provide a hydrostatic power transmission system having a novel control arrangement adapted to increase the output pressure of the pump in response to an increased load at a fluid motor in which the operation of the control is independent of the pressure and volume of fluid flow at the motor and responsive only to the mechanical load driven by the fluid motor.

Still another object of this invention is to provide a hydrostatic power transmission system having a plurality of fluid motors which operate under separate and independent control so that hydraulic, mechanical and electrical controls for different motors may be used in combination without affecting the independent operation of the other motors in the system.

Further objects and advantages of this invention relating to simplicity of construction and low cost of manufacture, as well as other particular features will readily become apparent to those skilled in the art upon a more complete understanding of the present invention as shown in the accompanying drawings and described in the following detailed description.

Figure 1:
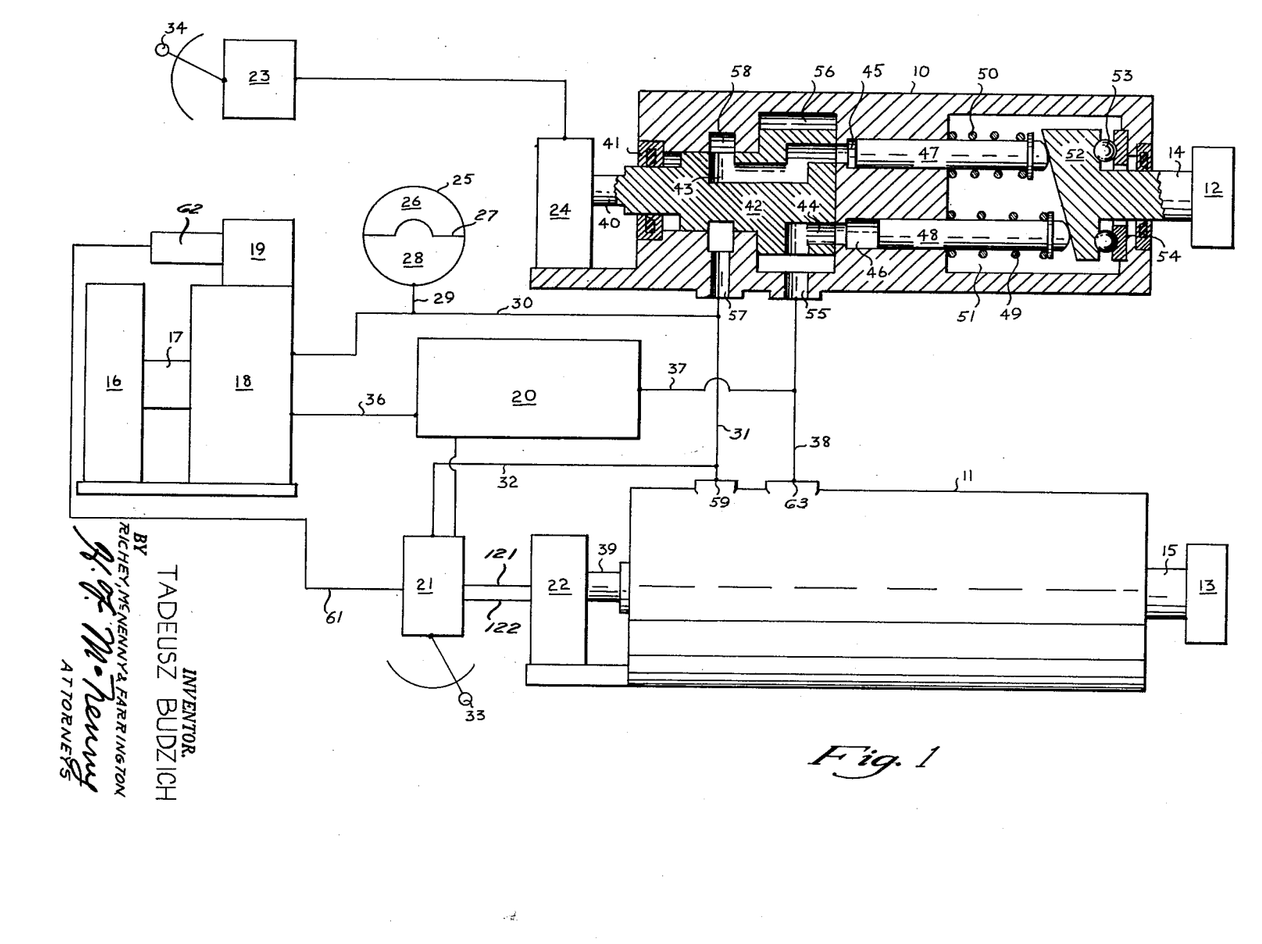
FIGURE 1 is a diagrammatic showing of a hydrostatic fluid power transmission system according to the present invention.

As shown in FIGURE 1, the hydrostatic fluid power transmission system includes a first fluid motor 10 arranged to drive a suitable load 12 through its output shaft 14. A second fluid motor is shown at 11 and is adapted to drive another load 13 through its output shaft 15. Both of these fluid motors are generally constructed in accordance with the teachings of the present inventor's issued U.S. Patent No. 2,979,037. The loads indicated at 12 and 13 may be of different kinds or they may be similar, such as two paired driving wheels on a vehicle.

The fluid power is supplied by a variable displacement pressure compensated pump indicated at 18 driven through a drive shaft 17 by a suitable prime mover 16 which may be an electric or internal combustion engine. The pump 18, which is described in greater detail hereinafter, is provided with a pressure compensated control indicated at 19 which operates to control the maximum output pressure of the pump. Fluid is supplied to pump 18 from a suitable reservoir 20 through an intake line 36 and discharged from the pump through outlet lines indicated at 30 and 31 leading to the inlet ports 57 and 59 of the motors 10 and 11, respectively. These motors 10 and 11 have drain or exhaust ports indicated at 55 and 63, respectively, which are connected through return lines 37 and 38 back to the reservoir 20.

A fluid pressure accumulator 25 is connected to the pump output line 30 through a connecting line 29 which leads into the expansible fluid chamber 28. The accumulator 25 may be of usual construction, with the variable volume fluid chamber 28 separated from a pressurized gas or spring chamber indicated at 26 by suitable means such as a diaphragm or piston indicated at 27. It will be understood that the accumulator 25 serves as a means to store a variable volume of fluid at the pressure existing in the pump output line 30 and the volume of pressurized fluid stored within the accumulator will vary under different operating conditions of the system as will be described in greater detail hereinafter.

Fluid motor 10 includes a plurality of cylinder bores indicated at 45 and 46 having pistons 47 and 48 reciprocable therein. Although only two cylinders and pistons are shown, it will be understood that the motor will have a greater number depending upon the torque requirement of the load. The pistons 47 and 48 bear against a rotary cam or swash plate 52 connected to the output shaft 14. The cam is shown mounted within a suitable chamber 51 within which springs 49 and 50 are carried by the pistons 47 and 48 to keep them in driving contact with the cam plate 52. A suitable thrust bearing 53 is provided to absorb the thrust action of the pistons 47 and 48 and chamber 51 is sealed by a suitable oil seal 54 surrounding the output shaft 14.

Fluid flow to and from the cylinder bores 45 and 46 is controlled by the rotary valve plate indicated at 42 which is rotatable independently of the cam 52 and output shaft 14. The valve plate 42 includes an inlet passage 43 which is shown as connected between cylinder bore 45 and an annular collector ring passage 58 connected to the inlet port 57. Likewise, the valve plate 42 has an exhaust or drain passage 44 shown as connected to cylinder bore 46 and connected through the annular space 56 to the drain or exhaust port 55. Both of the passages 43 and 44 connect with kidney shaped ports on the face of valve plate 42 so that rotation of the valve plate 42 alternately connects the cylinder bores to fluid pressure and to drain. When a cylinder bore such as cylinder bore 45 is connected to fluid pressure, such fluid pressure acts on the end of piston 47 which, through its action on the inclined face of cam 52 produces a torque on the cam 52 which is transferred by the output shaft 14 to the load 12. Likewise, when a cylinder bore such as cylinder bore 46 is connected to drain passage 44, the piston 48 is returned by continued rotation of the cam 52 to force the fluid within the cylinder bore out through the drain passages and back to the reservoir 20. It will therefore be seen that the relative positions of the valve plate 42 and the cam plate 52 determine both the direction of rotation and the magnitude of the output torque at the output shaft 14, as is described in greater detail in the present inventor's Patent No. 2,979,037.

In order to rotate the valve plate 42, the valve plate has an input shaft 40 which extends outwardly through an oil seal 41 to be driven by a drive or control motor 24. The drive motor 24 which rotates the valve plate 42 through the shaft 40 may be any type of motor which can be precisely controlled as to speed and direction of rotation, and it will be understood that rotation of the motor 24 operates the valve plate 42 to control the flow of fluid pressure to and from the pumping pistons to produce a torque on the cam 52. As a result, the output shaft 14 tends to rotate in the same direction as input shaft 40 with a torque determined by the phase difference between the positions of the shafts 40 and 14. Because of the relatively large torque produced by the action of the pumping pistons, the output shaft 14 exerts a far greater torque on the load 12 than is required by the output of the motor 24 to rotate the valve plate 42. Thus, the motor 10 operates as a torque multiplier having an output which corresponds to the input in speed and direction of rotation but in which the amount of torque at the output is greatly increased over that at the input.

The motor 24 may be of any type such as electric, hydraulic or pneumatic, and, as shown, is preferably a variable speed electric motor which may be controlled as to speed and direction of rotation by a suitable control 23 which may be operated by a control handle indicated at 34. Such motors are well known in the art and therefore will not be described in greater detail.

The other motor 11 is shown as having an input shaft 39 driven by a hydraulic motor such as gear motor 22. Fluid is supplied to the gear motor 22 from a control valve unit indicated at 21 which is supplied through pressure line 32 connected to line 31 so that the control valve unit 21 is supplied with the full output pressure of the pump 18. The control valve unit 21 is shown as having a control handle at 33 for controlling the supply of fluid to the gear motor 22 and will be described in greater detail hereinafter. A line indicated at 61 communicates the supply pressure for the gear motor 22 to an actuator 62 which is adapted to control the operation of the pressure compensated control 19 to vary the pressure in the output line 30 in the manner to be described in greater detail hereinafter.

Figure 2:
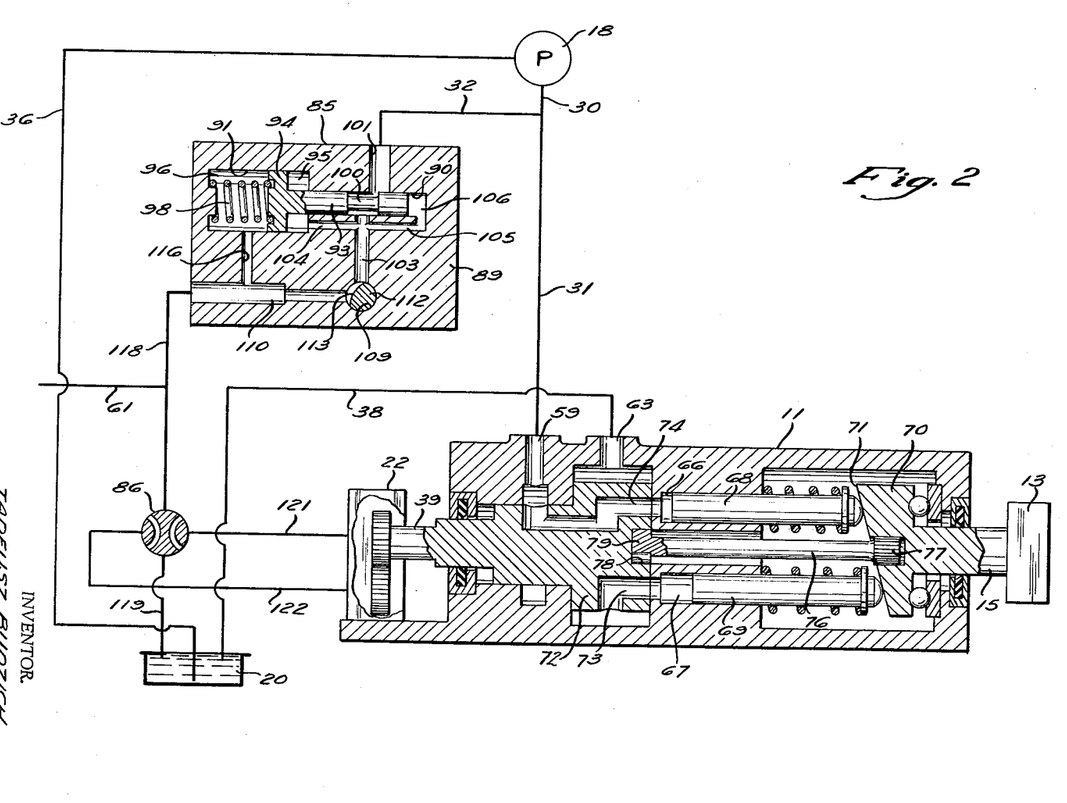
FIGURE 2 is a fragmentary schematic showing of a portion of the system of FIGURE 1 with certain portions illustrated in greater detail.

The details of motor 11 are shown in FIGURE 2. The motor or torque multiplier 11 is generally similar to motor 10 and includes cylinder bores 66 and 67 having pistons 68 and 69 reciprocable therein to rotate a cam plate 70 secured to the output shaft 15. The flow of fluid at the inlet and exhaust ports 59 and 63, respectively, is controlled by passages 74 and 73, respectively in the valve plate 72. These passages are alternately brought into alignment with the cylinder bores to control fluid pressure to and from the cylinder bores and thereby control the rotation of the cam plate 70 in the same general manner as described above in connection with the other motor 10.

Motor 11, unlike the motor shown at 10, has a lost motion connection between the cam plate 70 and the valve plate 72 to limit the amount of relative rotation between them, as disclosed in greater detail in the present inventor's issued Patent No. 2,979,037. The connection is made by lost motion shaft 76 which has a splined connection at 77 in cam plate 70 to rotate therewith. At the other end, head portion 79 of shaft 76 fits within a recess having an arcuate slot 78 which allows substantially 180° of rotational movement between the valve plate 72 and the shaft 76 and cam plate 70 before driving engagement is made. The slot 78 is positioned within the valve plate 72 so that when the head portion 79 is in the neutral position intermediate the ends of slot 78, the valve plate 72 will be so aligned with respect to the cam plate 70 that the pressure passage 73 will be connected equally to pistons symmetrically on each side of the peak or high point 71 of cam plate 70 and the exhaust passage 74 will likewise be connected to cylinders symmetrically on each side of the low point of the cam plate 70. Thus, the torques of each of the pistons will be balanced and there will be no net torque at output shaft 15. When the valve plate 72 is rotated toward one end of the slot 78 through an angle of 90°, the pressure passage 73 will be connected only to pistons lying on one side of the high point 71 of cam plate 70 while the exhaust passage 74 will be connected only to pistons lying on the other side. With the valve plate in this position, a maximum torque is applied to the cam plate 70 and output shaft 15 in the same direction of displacement from the neutral position of the valve plate 72 with respect to the cam 70 and lost-motion shaft 76. Likewise, when the valve plate 72 is rotated toward the other end of the slot, the change in phase of 90° from the neutral position will produce a maximum torque on the cam plate in the opposite direction.

The valve plate 72 is rotated through its input shaft 39 by a suitable hydraulic control motor such as gear motor 22. The control for motor 22 shown at 21 in FIGURE 1 is shown in greater detail in FIGURE 2 and includes a pressure compensated flow control valve 85 and a four-way reversing valve 86, both of which are operated by the control handle 33 by moving it in either direction from the neutral center position to give increasing speed in both directions of rotation.

The pressure compensated flow control valve 85 includes a body 89 having a valve bore 90 which opens at one end into an enlarged counterbore portion 91. A valve spool 93 is slidably mounted in valve bore 90 and has an enlarged piston portion 94 at one end within the counterbore 91. Piston portion 94 makes sealing contact with the walls of counterbore 91 to divide the counterbore 91 into a chamber 95 surrounding the valve spool 93 on one side of piston 94 and a second chamber 96 on the other side of piston 94. A compression spring 98 is located within chamber 96 and abuts against piston 94 to bias the latter in a direction to decrease the volume of chamber 95. Valve spool 93 has an annular groove 100 in alignment with an inlet passage 101 from which fluid enters the valve 85 from pressure line 32 which is connected directly to the pump 18 via the main pressure line 30. An intermediate passage 103 opens off valve bore 90 on the opposite side of bore 90 from the inlet passage 101 and is displaced axially a distance from the inlet passage 101 so that the axial position of groove 101 determines the effective area of communication between the passages 101 and 103 to control the fluid flow therethrough. A passage 104 extends from intermediate passage 103 to chamber 95, and another passage 105 extends from intermediate passage 103 to a chamber 106 at the opposite end of valve spool 103. Thus, the pressure at intermediate passage 103 is exerted on the area of piston 94 within chamber 95 and on the end of valve spool 93 so that it acts on a total area equal to the full diameter of the piston portion 94. The valve body 89 has a transverse bore 109 at the other end of intermediate passage 103 from which extends at right angles an outlet passage 110. A valve plug 112 is fitted within transverse bore 109 and has a slot portion 113 thereon to provide fluid communication between intermediate passage 103 and outlet passage 110. By rotating valve plug 112, the effective area of slot 113 in permitting fluid communication between passage 103 and passage 110 can be varied to provide a variable restriction at this point. It is understood that valve plug 112 may be rotated by the control handle 33.

In addition, another passage 116 extends from outlet passage 110 to chamber 96 so that the pressure acting at each side of the piston 94 reflects the pressure at each side of the restrictive slot 113. As a result, the pressure drop across slot 113 is reflected as a differential force across the piston 94 which is balanced by the biasing force of spring 98. Thus, regardless of variations of the fluid pressure in the inlet line 32, the valve spool 93 and annular groove 100 will be shifted to maintain a constant pressure drop across slot 113 as determined the force of spring 98 and because of this constant pressure drop across slot 113, the volume of fluid flow in the outlet passage 110 will be dependent only upon the effective area of slot 113 and will be independent of the pump outlet pressure in line 32.

To conduct the fluid from flow control valve 85, a line 118 extends between outlet passage 110 and the four-way reversing valve 86. A drain line 119 also extends between reversing valve 86 and reservoir 20 to conduct the fluid exhausted from the control motor 22 back to the reservoir. The four-way reversing valve 86 is connected to the motor 22 by lines 121 and 122 one of which will be at the pressure of outlet passage 110 and the other at drain pressure, depending upon the position of the reversing valve 86. Thus, reversing valve 86 is operable between two positions solely to control the direction of rotation of the control motor 22 and the speed of rotation of control motor is controlled by the flow control valve 85.

It will be seen that by operating the control handle 33, the position of valve plug 112 and hence slot 113 may be varied to control the volume of fluid flow to the control motor 22 and hence the speed of this motor. The control motor 22 will drive the valve plate 72 in the manner so that the main fluid supply to the motor 11 to inlet line 31 will drive the cam plate 70 in the same direction of rotation as the input shaft 39 and will maintain a phase difference between the valve plate 72 and cam plate 70 in the range between 0 and 90° depending upon the torque output requirements at the load 13.

The control for the motor 11 provides for increasing the output pressure of pump 18 in case the load at 13 should increase beyond the maximum torque capability of motor 11 at the 90° maximum torque position. If this happens, the load 13 will tend to rotate more slowly than the valve plate 72 so that the lost motion connection at slot 78 with the head portion 79 of lost-motion shaft 76 will reach the full 90° maximum torque position and limit further relative movement between shaft 76 and valve plate 72. When this happens, there is a direct driving connection to the lost-motion shaft 76 between the control motor 22 and input shaft 39 and the output shaft 15. The result is that the control motor 22 tends to drive the output shaft 15, and since the load 13 tends to slow down the speed of rotation of the shaft 15 and hence the input shaft 39, the fluid pressure supplied to the control motor 22 will increase, since at the lower speed the motor cannot use the full volume of fluid supplied to it as determined by the setting of control handle 33. As a result, the pressure in the outlet passage 110 and in line 118 increases above the normal level. This pressure level is reflected through the connecting line 61 back to the actuator 62 for the pressure compensated control 19 and pump 18. Actuator 62 operates under the increased pressure in line 61 to change the setting of the pressure compensated control and increase the output pressure of the pump 18. This increased pressure is then transmitted through line 30 to inlet port 59 of the torque multiplier motor 11 and this increased pressure acting on the pistons 68 and 69 produces an increased torque on cam plate 70 and output shaft 15 tending to increase the speed of output shaft 15 and apply more torque to the load 13 to bring its speed back up to the level required by the setting of control handle 33. Thus, the supply pressure to the control motor 22 acting through line 61 serves as a feed-back control to increase the supply pressure to increase the torque at output shaft 15 to maintain the controlled speed determined by the setting of control handle 33.

Figure 3:
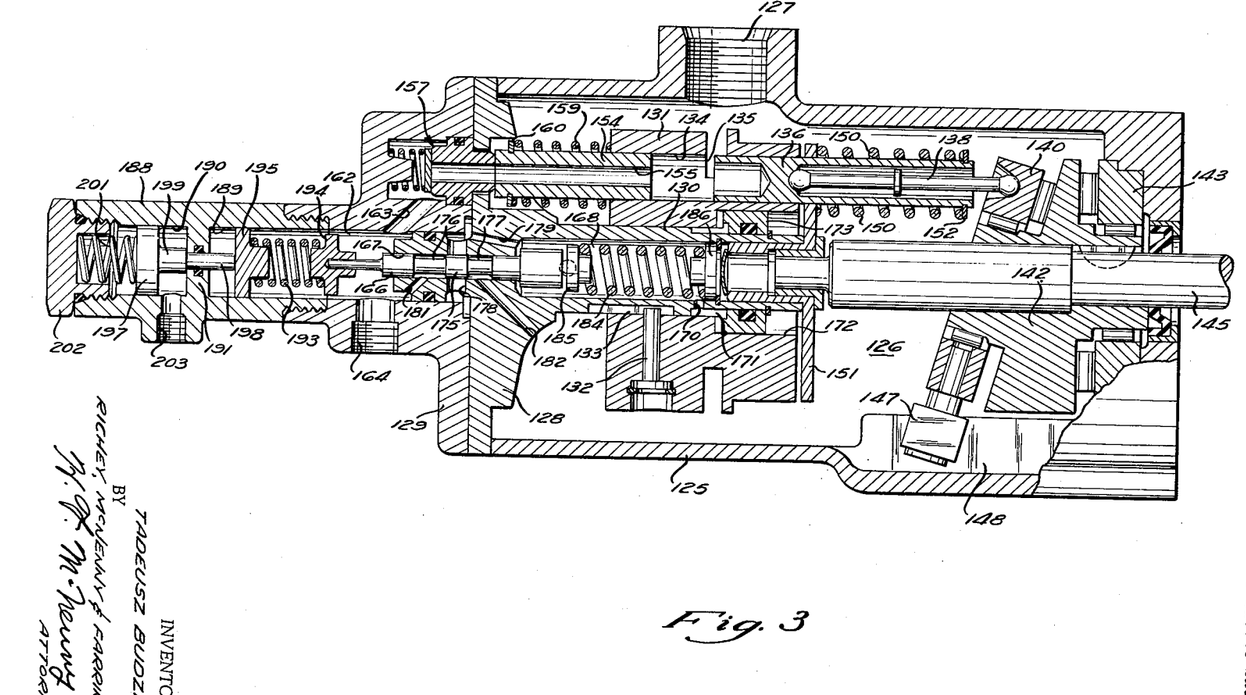
FIGURE 3 is a cross-sectional view of the pump and pump control used in the system of FIGURE 1.

The operation of actuator 62 is shown most clearly in conjunction with FIGURE 3 showing details of the pressure compensated pump 18. This pump is preferably of the type disclosed in the present inventor's copending application Serial No. 825,005, filed July 6, 1959. The pump includes a pump housing 125 having a fluid chamber 126 therein which is filled at all times with fluid which enters through the inlet 127 connected through line 36 to reservoir 20. At one end, the pump housing 125 is closed off by end plate 128 and end cap 129, both of which are secured to the pump housing 125 in a suitable manner. The end plate 128 has a projecting tubular guide portion 130 which extends axially into the chamber 126 to support the cylinder block 131 which is mounted thereon for axial sliding movement and prevented from rotating by means of the pin 132 which engages the longitudinal slot 133 on the guide 130. The cylinder block 131 has a plurality of axial cylinder bores 134 extending from end to end therethrough, only one of which is shown and described. A port 135 is cut into the cylinder block to permit the fluid within the chamber 126 to enter the cylinder bore at a point intermediate the ends, and sliding movement of the cylinder block 131 along the tubular guide 130 will move the port 135 relative to the stroke of the pumping piston 136 to vary the output displacement of the pump by changing the length of the effective stroke of the piston.

A pumping piston 136 within the cylinder bore 134 is connected by a piston rod 138 to a wobble plate 140. Wobble plate 140 is mounted on a driving cam 142 which is journaled on a bearing structure 143 carried by the pump housing 125. An extension portion 145 of drive shaft 17 engages the driving cam 142 to rotate the latter and cause the wobble plate 140 to oscillate to drive the piston 136 on the forward stroke. The wobble plate 140 is prevented from rotating with the driving cam 142 by the projecting guide block 147 which slides axially within the channel 148 during oscillation of the wobble plate 140. In order to return the piston 136, a spring 150 is fitted around the piston skirt to abut at the one end against a fixed plate 151 carried by the tubular guide 130, and the spring 150 abuts at the other end against a snap ring 152 carried on the piston skirt to continually bias the piston toward the wobble plate 140.

A tubular reaction piston 154 is fitted within the end of cylinder bore 134 opposite the piston 136 and extends toward the end cap 129. The reaction piston 154 has a hollow bore 155 extending from end to end therethrough to convey the fluid pumped by the movement of piston 136 to a check valve assembly indicated at 157 mounted within the end cap 129. The reaction piston 154 is maintained in face-to-face sealing contact with the check valve assembly 157 by a spring 159 which abuts at the one end on the cylinder block 131 and at the other end against a snap ring 160 carried on reaction piston 154. Thus the spring 159 not only insures sealing engagement between the reaction piston 154 and the check valve assembly 157, but it also biases the cylinder block 131 toward the maximum displacement position adjacent plate 151. The end cap 129 has a centrally located outlet chamber 162 which is connected to each of the check valve assemblies 157 by suitable passage means indicated at 163. Thus the fluid pumped from each of the cylinder bores of the pump passes into the outlet chamber 162 and from there through the outlet 164 to line 30.

The pump incorporates a pressure compensated control which shifts the axial position of cylinder block 131 to vary the effective output displacement of the pump in response to increases in the outlet pressure above a predetermined level. The pressure compensated control, which has been indicated in FIGURE 1 at 19, is shown in detail in FIGURE 3 and includes a valve spool 166 which is fitted for axial sliding movement within a bore 167 in end plate 128 extending between the outlet chamber 162 and chamber 168 within the tubular guide portion 130. The chamber 168 is connected by radial passage 170 to a motor chamber 171 which is formed by counterbore 172 within cylinder block 131 and piston 173 carried on the end of tubular guide portion 130 adjacent the plate 151. Valve spool 166 is provided with a valving land 175 and annular grooves 176 and 177 which cooperate with annular port 178 and passage 179 to control the flow of fluid to and from the chamber 168 and hence the motor chamber 171. When valve spool 166 is shifted inward on to the right from the neutral position shown in FIGURE 3, fluid will pass from outlet chamber 162 through passage 181 to outer groove 176 and hence through port 178 and passage 179 to the chamber 168 and then into motor chamber 171 to shift the cylinder block 131 away from the plate 151 to reduce the effective output volume of the pump. When the valve spool 166 is shifted in the opposite direction, fluid is then free to exhaust or drain from motor chamber 171 and chamber 168 through the passage 179 to annular port 178 and from there to the inner groove 177 and through the drain passage 182 to the fluid chamber 126. When the valve spool 166 is between these positions, the land 175 will completely block the annular port 178 to maintain the cylinder block in a stationary position.

The operation of the valve spool 166 and hence the output displacement of the pump depends upon the balance of forces acting on the valve spool. The valve spool is biased in the direction to admit fluid at outlet pressure into the motor chamber to decrease the output displacement of the pump by virtue of the outlet pressure acting on the exposed area of the valve spool 166 within the outlet chamber 162. This force is opposed by the fluid pressure within the chamber 168 also acting on the cross-sectional area of the valve spool together with the biasing force of the control spring 184 which is located within chamber 168 between the fixed abutment 186 at the outer end of chamber 168 and a movable abutment 185 carried on the exposed end of valve spool 166 within chamber 168. Since the fluid pressure in chamber 168 and within motor chamber 171 will be at that level required to counterbalance the combined forces of the springs 159 on each of the reaction pistons, this fluid pressure will be relatively low as compared to the outlet pressure in chamber 162 and the pressure level at which the pressure compensated control comes into operation may therefore be considered as determined by the effective biasing force of control spring 184.

The pressure compensated control operates to limit the maximum outlet pressure to a level of, for example, 2000 p.s.i. unless the pressure in line 61 operates the actuator 62 to increase the control pressure of the pressure compensated control to a level of, for example, 3000 p.s.i. at which level the control operates in the same manner to prevent any further increases in pressure.

The increase in the control pressure by actuator 62 is accomplished by providing a variable counterbalancing force to the valve spool 166 to oppose the control spring 184. As shown in FIGURE 3, the actuator 62 includes a housing 188 connected to the end cap 129 to close off the outer end of outlet chamber 162. The housing 188 has a pair of opposed bores 189 and 190 separated by a web 191. Counterbore 189 opens into the outlet chamber 162 and within this bore is a counterbalance spring 193 which abuts at one end against an abutment member 194 carried on the exposed end of valve spool 166 and at the other end against a floating piston 195 slidable in bore 189. An actuator piston 197 is mounted within the other bore 189 and has a piston rod 198 which extends through the web portion 191 to contact the floating piston 195 and hold the latter away from web 191 and compress the counterbalance spring 193. Movement of actuator piston 197 and piston rod 198 is limited by the enlarged portion 199 of piston rod 198 which engages the web 191 to provide a positive limit of travel of piston 197. A stiff spring 201 is supported by a cap 202 closing off the counterbore 190 and serves to bias the piston 197 to compress the counterbalance spring 193.

The control spring 184 and the counterbalance spring 193 are so chosen that when the counterbalance spring 193 is compressed the valve spool 166 will operate at a pressure level of 2000 p.s.i. to reduce the output displacement of the pump in response to any increase of pressure above that level. When pressure is introduced through connecting line 61 to fitting 203, this pressure acts against the actuator piston 197 to move toward the end cap 202 and thereby allow the floating piston 195 to move back into contact with the web 191 and decrease the force of the counterbalance spring 193 acting on the valve spool 166. This decrease in the force of the counterbalance spring 193 increases the effective force of the control spring 184 so that the pressure compensated control now operates at a higher pressure level of 3000 p.s.i. Thus, depending upon the operation of actuator 62 and the counterbalance spring 193, the pressure compensated control operates at one of two different pressure levels in response to the requirements of the system.

When the hydrostatic transmission is employed to drive different loads 12 and 13 and one of these loads is caused to decrease and unload the associated motor, the decrease in the required output torque of the motor tends to allow the output shaft of this motor to increase in speed. However, the flow of pressure fluid to the drive pistons of the motor is controlled only by the rotation of the input shaft of the valve plate. As a result, the increase in the speed of the output shaft reduces the positive phase angle by which the valve plate leads the driving cam and reduces the amount of positive or driving output torque to that level required to continue to drive the load at the control speed of the input shaft, since at zero phase angle the motor produces no net output torque. If the load should become negative and tend to increase in speed, it will drive the motor output shaft, and the phase angle between the cam plate and the valve plate becomes negative as the valve plate lags the cam plate. When this happens, the pistons act to produce a reverse or braking torque to the cam plate and the load. Since the fluid flow is controlled entirely by the control motor and valve plate, the motor can not increase its speed and consume a greater volume of fluid which would cause a decrease in the pressure throughout the system.

When the valve plate is moved to a negative phase angle and produces a braking torque, the braking is accomplished by the load doing work upon the output shaft, and therefore, the motor pistons operate to pump fluid from the outlet or drain back into the inlet and thereby increase the pressure in the line. During these conditions, the motor acts as a pump forcing fluid from the exhaust port and reservoir 20 back into the main inlet line 30. This allows the variable displacement pump 18 to reduce its capacity, since the fluid pumped by the one motor back into the inlet line may be used to supply the other motor driving its load. If both motors pump fluid back into the inlet line, or if the volume pumped by one of the motors exceeds the capacity of the other motor, the accumulator 25 stores the fluid and maintains a constant line pressure determined by the setting of the pressure compensated control 19. The fluid stored in accumulator 25 is available for use during subsequent operation of the system for driving the motors 10 and 11 and will reduce the output requirement of the pump. The fluid pressure available in accumulator 25 thus serves to conserve the total energy in the system by storing the absorbed braking energy as fluid pressure rather than dissipating it as heat, and also allows the accumulator 25 to supply additional fluid at line pressure to the motors 10 and 11 in case the volume required by transient loads exceeds the maximum output capacity of the pump 18.

Although the preferred embodiment of this invention has been shown and described in considerable detail, it is understood that various modifications and rearrangements will readily become apparent to those skilled in the art upon a full comprehension of this invention, and such modifications and rearrangements may therefore be resorted to without departing from the scope of the present invention as defined in the following claims.

What is claimed is:

1. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, pressure and exhaust conduit means interconnecting said pump and said motor, valve means having pressure and exhaust zones connected to said conduit means and adapted to sequentially alternatively connect said cylinders with said zones, said motor having a rotatable input shaft angularly movable with respect to said output shaft and adapted to operate said valve means, and control motor means to rotate said input shaft whereby fluid pressure from said pump drives said load when said input shaft leads said output shaft and applies a braking force on said load when said input shaft lags said output shaft and said pressure compensated control varies the pump volume in response to the volume of flow through said motor to maintain substantially constant pressure in said pressure conduit means.

2. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, pressure and exhaust conduit means interconnecting said pump and said motor, valve means having pressure and exhaust zones connected to said conduit means and adapted to sequentially alternatively connect said cylinders with said zones, said motor having a rotatable input shaft angularly movable with respect to said output shaft and adapted to operate said valve means, an electric motor adapted to rotate said input shaft whereby fluid pressure from said pump drives said load when said input shaft leads said output shaft and applies a braking force on said load when said input shaft lags said output shaft and said pressure compensated control varies the pump volume in response to the volume of flow through said fluid motor to maintain a substantially constant pressure in said pressure conduit means, and control means for supplying electric power to said electric motor to control the rotation thereof.

3. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, pressure and exhaust conduit means interconnecting said pump and said motor, valve means having pressure and exhaust zones connected to said conduit means and adapted to sequentially alternatively connect said cylinders with said zones, said motor having a rotatable input shaft angularly movable with respect to said output shaft and adapted to operate said valve means, a second fluid motor adapted to rotate said input shaft whereby fluid pressure from said pump drives said load when said input shaft leads said output and applies a braking force on said load when said input shaft lags said output shaft and said pressure compensated control varies the pump volume in response to the volume of flow through said first fluid motor to maintain a substantially constant pressure in said pressure conduit means, and control valve and second conduit means connecting said pump to said second motor to control the rotation thereof.

4. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, a fluid reservoir, an intake line from said reservoir to said pump, an exhaust line from said motor to said reservoir, a pressure line from said pump to said motor, a fluid pressure accumulator connected to said pressure line, valve means on said motor having pressure and exhaust zones connected to said pressure and exhaust lines and adapted to sequentially alternatively connect said cylinders with said zones, said motor having a rotatable input shaft angularly movable with respect to said output shaft and adapted to operate said valve means, and control motor means to rotate said input shaft whereby fluid pressure from said pump drives said load when said input shaft leads said output shaft and applies a braking force on said load when said input shaft lags said output shaft, said motor when applying a braking force on said load acting as a pump to pump fluid from said fluid reservoir into said pressure line to charge said fluid pressure accumulator.

5. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, a fluid reservoir, an intake line from said reservoir to said pump, an exhaust line from said motor to said reservoir, a pressure line from said pump to said motor, a fluid pressure accumulator connected to said pressure line, valve means on said motor having pressure and exhaust zones connected to said pressure and exhaust lines and adapted to sequentially alternatively connect said cylinders with said zones, said motor having a rotatable input shaft angularly movable with respect to said output shaft and adapted to operate said valve means, an electric motor adapted to rotate said input shaft whereby fluid pressure from said pump drives said load when said input shaft leads said output shaft and applies a braking force on said load when said input shaft lags said output shaft, whereby said fluid motor when applying a braking force on said load acts as a pump to pump fluid from said fluid reservoir into said pressure line to charge said fluid pressure accumulator, and control means for supplying electric power to said electric motor to control the speed and direction of rotation thereof.

6. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, a fluid reservoir, an intake line from said reservoir to said pump, an exhaust line from said motor to said reservoir, a pressure line from said pump to said motor, a fluid pressure accumulator connected to said pressure line, valve means on said motor having pressure and exhaust zones connected to said pressure and exhaust lines and adapted to sequentially alternatively connect said cylinders with said zones, said motor having a rotatable input shaft angularly movable with respect to said output shaft and adapted to operate said valve means, a second fluid motor adapted to rotate said input shaft whereby fluid pressure from said pump drives said load when said input shaft leads said output shaft and applies a braking force on said load when said input shaft lags said output shaft, said first fluid motor when applying a braking force on said load acting as a pump to pump fluid from said fluid reservoir into said pressure line to charge said fluid pressure accumulator, and control valve and conduit means connecting said pump to said second motor to control the rotation thereof.

7. A variable speed hydrostatic transmission for driving a rotatable load from a prime mover comprising a fluid motor having stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pressure compensated pump adapted to be driven by said prime mover, a fluid reservoir, an intake line from said reservoir to said pump, an exhaust line from said motor to said reservoir, a pressure line from said pump to said motor, valve means on said motor having pressure and exhaust zones connected to said pressure and exhaust lines and adapted to sequentially alternatively connect said cylinders with said zones, said motor having a rotatable input shaft angularly movable with respect to said output shaft and adapted to operate said valve means, a second positive displacement fluid motor adapted to rotate said input shaft whereby fluid pressure from said pump drives said load in response to rotation of said input shaft, a four-way reversing valve adapted to control the flow of fluid to and from said second motor, a line connecting said reversing valve to said reservoir, and a pressure compensated flow control valve connected between said pressure line and said reversing valve to control the flow of fluid to said second fluid motor to control the speed of rotation thereof.

8. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a pressure compensated control adapted to vary the volume of said pump, pressure and exhaust conduit means interconnecting said pump and said motor, valve means having pressure and exhaust zones connected to said conduit means and adapted to sequentially alternatively connect said cylinders with said zones, said motor having a rotatable input shaft angularly movable with respect to said output shaft and adapted to operate said valve means, a lost motion connection between said output shaft and said input shaft adapted to limit the amount of angular movement between said shafts, a second fluid motor adapted to rotate said input shaft whereby fluid pressure from said pump drives said load when said input shaft leads said output shaft and applies a braking force on said load when said input shaft lags said output shaft and said pressure compensated control varies the pump volume in response to the volume of flow through said first fluid motor to maintain a substantially constant pressure in said pressure conduit means, and control valve and second conduit means connecting said pump to said second motor to control the rotation thereof.

9. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a variable pressure compensated control adapted to control the output volume of said pump, pressure and exhaust conduit means interconnecting said pump and said motor, valve means on said motor having pressure and exhaust zones connected to said conduit means and adapted to sequentially alternatively connect said cylinders with said zones, said motor having a rotatable input shaft angularly movable with respect to said output shaft and adapted to operate said valve means, a lost motion connection between said input shaft and said output shaft adapted to limit the amount of angular movement between said shafts, a second fluid motor adapted to rotate said input shaft whereby fluid pressure from said pump drives said load in response to rotation of said input shaft, control valve and second conduit means connecting said pump to said second motor to control the rotation thereof, and control means operable when the pressure supplied to said second motor exceeds a predetermined level to increase the output pressure of said variable volume pump.

10. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pump adapted to be driven by said prime mover, a variable pressure compensated control adapted to control the output volume of said pump, pressure and exhaust conduit means interconnecting said pump and said motor, cyclically operable valve means on said motor having pressure and exhaust zones connected to said conduit means and adapted to sequentially alternatively connect said cylinders with said zones, said motor having a rotatable input shaft angularly movable with respect to said output shaft and adapted to cyclically operate said valve means, a lost motion connection between said input shaft and said output shaft adapted to limit the amount of angular movement between said shafts, a second fluid motor adapted to rotate said input shaft whereby fluid pressure from said pump drives said load in response to rotation of said input shaft, control valve and second conduit means connecting said pump to said second motor to control the rotation thereof, and fluid pressure actuator means responsive to the pressure supplied to said second motor and operative when said pressure exceeds a predetermined level to operate said variable pressure compensated control to increase the output pressure of said variable volume pump.

11. A variable speed hydrostatic transmission for driving a rotatable load from a prime mover comprising a fluid motor having a stationary cylinder barrel with a plurality of cylinders therein, pistons reciprocable in each of said cylinders, an output shaft adapted to rotatably drive said load, a cam plate on said output shaft adapted to rotate by said pistons on their outward strokes and to return said pistons on their inward strokes, a variable volume pump adapted to be driven by said prime mover, a variable pressure compensated control adapted to vary the output volume of said pump, a fluid reservoir, an intake line from said reservoir to said pump, an exhaust line from said motor to said reservoir, a pressure line from said pump to said motor, cyclically operable valve means on said motor having pressure and exhaust zones connected to said pressure and exhaust lines and adapted to sequentially alternatively connect said cylinders to said zones, said motor having a rotatable input shaft angularly movable with respect to said output shaft and adapted to cyclically operate said valve means, lost motion shaft means interconnecting said input shaft and said output shaft to limit the amount of angular movement between said shafts, a second positive displacement fluid motor adapted to rotate said input shaft whereby fluid pressure from said pump drives said load in response to rotation of said input shaft, a reversing valve adapted to control the direction of flow through said second fluid motor, a line from said reversing valve to said reservoir, a pressure compensated flow control valve connected between said pressure line and said reversing valve and adapted to control the flow of fluid to said second motor to control the rotation thereof, and a fluid pressure actuator operatively connected to said pressure compensated control of said pump and responsive to the fluid pressure supplied to the second fluid motor whereby when said pressure exceeds a predetermined level said actuator operates said variable pressure compensated control to increase the maximum output pressure of said pump.

12. A variable speed hydrostatic transmission for driving a rotatable load from a prime mover comprising a fluid motor having stationary cylinder barrel with a plurality of cylinders therein, pistons reciprocable in each of said cylinders, an output shaft adapted to rotatably drive said load, a cam plate on said output shaft adapted to be rotated by said pistons on their outward strokes and to return said pistons on their inward strokes, a variable volume pressure compensated pump adapted to be driven by said prime mover, a fluid reservoir, an intake line from said reservoir to said pump, and an exhaust line from said motor to said reservoir, a pressure line from said pump to said motor, a fluid pressure accumulator connected to said pressure line, valve means on said motor having pressure and exhaust zones connected to said pressure and exhaust lines and adapted to sequentially alternatively connect said cylinders with said zones, said motor having a rotatable input shaft angularly movable with respect to said output shaft and adapted to operate said valve means, control motor means adapted to rotate said input shaft whereby when said input shaft leads said output shaft said pistons exert a torque on said output shaft in the direction of rotation of said output shaft and when said input shaft lags said output shaft said cam plate operates said pistons to pump fluid from said reservoir and said exhaust line into said pressure line and said accumulator and exert a torque opposing the rotation of said output shaft.

13. A hydrostatic transmission for driving at least two independent rotatable loads from a prime mover comprising a first fluid motor having an output shaft drivingly connected to one of said loads, a second fluid motor having an output shaft drivingly connected to the other of said loads, each of said motors including a stationary cylinder barrel having a plurality of cylinders therein with pistons reciprocable in each of said cylinders and a cam plate on the output shaft adapted to be rotated by said pistons on their outward strokes and to return said pistons on their inward strokes, a variable volume pump adapted to be driven by said prime mover, pressure and exhaust conduit means interconnecting said pump and each of said motors, valve means on each motor having pressure and exhaust zones connected to said conduit means and adapted to sequentially alternatively connect the motor cylinders with said zones, each motor having a rotatable input shaft angularly movable with respect to the output shaft of the motor and adapted to operate the valve means of the motor, first control motor means to rotate the input shaft of said first motor, and second control motor means to rotate the input shaft of said second motor whereby fluid pressure from said pump drives each load when the motor input shaft leads its output shaft and fluid pressure is pumped back into said pressure conduit means when the motor input shaft lags its output shaft to be available to drive the other fluid motor.

14. A hydrostatic transmission for driving at least two independent rotatable loads from a prime mover comprising a first fluid motor having an output shaft drivingly connected to one of said loads, a second fluid motor having an output shaft drivingly connected to the other of said loads, each of said motors including a stationary cylinder barrel having a plurality of cylinders therein with pistons reciprocable in each of said cylinders and a cam plate on the output shaft adapted to be rotated by said pistons on their outward strokes and to return said pistons on their inward strokes, a variable volume pump adapted to be driven by said prime mover, a fluid reservoir, an intake line from said reservoir to said pump, an exhaust line from each of said motors to said reservoir, a pressure line from said pump to both of said motors, a fluid pressure accumulator connected to said pressure line adapted to store a variable volume of fluid at pump outlet pressure, cyclically operable valve means on each motor having pressure and exhaust zones connected to said pressure and exhaust lines and adapted to sequentially alternatively connect the motor cylinders with said zones, each motor having a rotatable input shaft angularly movable with respect to the output shaft of the motor and adapted to cyclically operate the valve means of the motor, first control motor means to rotate the input shaft of said first motor, and second control motor means to rotate the input shaft of said second motor whereby fluid pressure from said pump drives each load when the motor input shaft leads its output shaft and fluid pressure is pumped back into said pressure line when the motor input shaft lags its output shaft to be available to drive the other fluid motor.

15. A hydrostatic transmission for driving at least two independent rotatable loads from a prime mover comprising a first fluid motor having an output shaft drivingly connected to one of said loads, a second fluid motor having an output shaft drivingly connected to the other of said loads, each of said motors including a stationary cylinder barrel having a plurality of cylinders therein with pistons reciprocable in each of said cylinders and a cam plate on the output shaft adapted to be rotated by said pistons on their outward strokes and to return said pistons on their inward strokes, a variable volume pump adapted to be driven by said prime mover, pressure and exhaust conduit means interconnecting said pump and each of said motors, cyclically operable valve means on each motor having pressure and exhaust zones connected to said conduit means and adapted to sequentially alternatively connect the motor cylinders with said zones, each motor having a rotatable input shaft angularly movable with respect to the output shaft of the motor and adapted to cyclically operate the valve means of the motor, first control motor means to rotate the input shaft of said first motor, second control motor means to rotate the input shaft of said second motor whereby fluid pressure from said pump drives each load when the motor input shaft leads its output shaft and fluid pressure is pumped back into said pressure conduit means when the motor input shaft lags its output shaft to be available to drive the other motor, said second control motor means including a third positive displacement fluid motor drivingly connected to the input shaft of said second motor, and control valve and second conduit means connecting said pump to said third motor to control the rotation thereof.

16. A hydrostatic transmission for driving at least two independent rotatable loads from a prime mover comprising a first fluid motor having an output shaft drivingly connected to one of said loads, a second fluid motor having an output shaft drivingly connected to the other of said loads, each of said motors including a stationary cylinder barrel having a plurality of cylinders therein with pistons reciprocable in each of said cylinders and a cam plate on the output shaft adapted to be rotated by said pistons on their outward strokes and to return said pistons on their inward strokes, a variable volume pump adapted to be driven by said prime mover, a variable pressure compensated control adapted to control the output volume of said pump, pressure and exhaust conduit means interconnecting said pump and each of said motors, cyclically operable valve means on each motor having pressure and exhaust zones connected to said conduit means and adapted to sequentially alternatively connect the motor cylinders with said zones, each motor having a rotatable input shaft angularly movable with respect to the output shaft of the motor and adapted to cyclically operate the valve means of the motor, said second motor having a lost motion connection between its input shaft and its output shaft adapted to limit the amount of angular movement between these shafts, first control motor means to rotate the input shaft of said first motor, second control motor means to rotate the input shaft of said second motor whereby fluid pressure from said pump drives each load in response to rotation of the input shaft of the motor connected to such loads, said second control motor means including a third positive displacement fluid motor drivingly connected to the input shaft of said second motor, control valve and second conduit means connecting said pump to said third motor to control the rotation thereof, and control means operable when the pressure supplied to said third motor exceeds a predetermined level to increase the output pressure of said variable volume pump.

17. A variable speed hydrostatic transmission for driving a rotatable load from a prime mover comprising a fluid pressure motor having a rotatable output shaft, a power cylinder, a piston reciprocable in said cylinder and arranged to drive said output shaft on its outward stroke, said motor including an exhaust passageway and an inlet passageway adapted to be connected to a source of fluid under pressure, valve means movable through a cycle to connect said cylinder alternately to said input passageway and to said exhaust passageway, a separate motor means connected to said valve means to move the same through its cycle at a rate determined by the speed of said separate motor means, said output shaft being free to shift the phase of said piston relative to the phase of said valve means, stop means to limit such phase shifting in one direction and transmit torque from said separate motor means to said output shaft, a variable volume pump adapted to be driven by said prime mover, said pump having an outlet connected to said inlet passageway and an inlet connected to said exhaust passageway, a pressure compensated control adapted to vary the volume of said pump responsive to changes in the pressure in said pump outlet to maintain a substantially constant pressure level in said inlet passageway of said motor, whereby the volume of said pump is adjusted at a substantially constant pressure level with the variation of fluid flow through said fluid pressure motor as determined by the operation of said separate motor means.

References Cited in the file of this patent

UNITED STATES PATENTS

| Re. 9,408 | Harrison | Oct. 12, 1880 |
| 2,263,315 | Rose | Nov. 18, 1941 |
| 2,467,576 | Zimmerman | Apr. 19, 1949 |
| 2,979,037 | Budzich | Apr. 1, 1961 |
| 3,043,107 | Magnus | July 10, 1962 |